US012014655B2

(12) United States Patent
Young et al.

(10) Patent No.: US 12,014,655 B2
(45) Date of Patent: Jun. 18, 2024

(54) SPIN REVEAL EXTENDED CONTENT LABEL

(71) Applicant: Multi-Color Corporation, Batavia, OH (US)

(72) Inventors: Patrick A. Young, Appleton, WI (US); Dimitri Stamatiou, Green Bay, WI (US)

(73) Assignee: Multi-Color Corporation, Batavia, OH (US)

(*) Notice: Subject to any disclaimer, the term of this patent is extended or adjusted under 35 U.S.C. 154(b) by 120 days.

(21) Appl. No.: 17/663,460

(22) Filed: May 16, 2022

(65) Prior Publication Data

US 2023/0028162 A1 Jan. 26, 2023

Related U.S. Application Data

(60) Provisional application No. 63/224,441, filed on Jul. 22, 2021.

(51) Int. Cl.
*G09F 3/02* (2006.01)
*B65C 3/06* (2006.01)
*G09F 3/10* (2006.01)

(52) U.S. Cl.
CPC ................ *G09F 3/02* (2013.01); *B65C 3/065* (2013.01); *G09F 3/10* (2013.01); *G09F 2003/025* (2013.01); *G09F 2003/0272* (2013.01)

(58) Field of Classification Search
CPC ....... G09F 2003/0272; G09F 2003/025; G09F 3/10; G09F 3/02; B65C 3/065
See application file for complete search history.

(56) References Cited

U.S. PATENT DOCUMENTS

| | | | | |
|---|---|---|---|---|
| 1,891,353 | A * | 12/1932 | Koehrman | G09F 3/04 40/310 |
| 6,086,697 | A * | 7/2000 | Key | G09F 3/10 40/310 |
| 6,129,802 | A | 10/2000 | Key | |
| 6,212,803 | B1 | 4/2001 | Key | |
| 6,237,269 | B1 | 5/2001 | Key | |
| 6,276,533 | B1 | 8/2001 | Kaplan | |
| 6,385,878 | B1 * | 5/2002 | Key | G09F 3/0288 40/310 |

(Continued)

FOREIGN PATENT DOCUMENTS

| | | |
|---|---|---|
| CA | 2399901 A1 | 8/2001 |
| WO | 200160312 A1 | 8/2001 |

(Continued)

*Primary Examiner* — David R Dunn
*Assistant Examiner* — Christopher E Veraa
(74) *Attorney, Agent, or Firm* — Wood Herron & Evans LLP

(57) ABSTRACT

A label, a method of assembling the label, and a method for using the label are presented. The label includes a base ply. A tab extends from the base ply in a longitudinal direction. The label also includes a top ply located atop and dimensioned to cover the base ply. The tab of the base ply is not covered by the top ply. The label further includes an outer layer located atop and dimensioned to cover the top ply. The tab of the base ply is secured to the outer layer. Moving the outer layer in a direction pulls a portion of the base ply from beneath the top ply such that the portion of the base ply can be visibly perceived.

19 Claims, 5 Drawing Sheets

(56) References Cited

U.S. PATENT DOCUMENTS

| | | | | |
|---|---|---|---|---|
| 6,402,872 | B1 | 6/2002 | Key | |
| 6,413,604 | B1 * | 7/2002 | Matthews | G09F 3/10 40/310 |
| 6,581,773 | B2 | 6/2003 | Kaplan | |
| 6,631,578 | B2 | 10/2003 | Key | |
| 6,649,007 | B1 * | 11/2003 | Key | G09F 3/02 156/215 |
| 7,087,298 | B2 | 8/2006 | Key | |
| 7,172,668 | B2 | 2/2007 | Key | |
| 7,272,901 | B2 * | 9/2007 | Jewitt | B42D 1/00 40/445 |
| 7,603,802 | B2 * | 10/2009 | Oudekerk | G09F 7/10 40/445 |
| 7,762,398 | B2 * | 7/2010 | Tokie | G09F 3/0289 248/339 |
| D643,291 | S | 8/2011 | Haskins | |
| 8,479,919 | B2 | 7/2013 | Kaplan et al. | |
| 8,708,198 | B2 | 4/2014 | Proper et al. | |
| 8,727,220 | B2 | 5/2014 | Key | |
| D706,624 | S | 6/2014 | Key | |
| D706,625 | S | 6/2014 | Key | |
| 8,814,217 | B2 | 8/2014 | Key | |
| 8,973,755 | B2 | 3/2015 | Key | |
| 9,085,402 | B2 | 7/2015 | Key | |
| 9,342,999 | B2 | 5/2016 | Key | |
| 10,410,556 | B2 | 9/2019 | Key | |
| 10,438,516 | B2 | 10/2019 | Key | |
| 10,889,501 | B2 | 1/2021 | Chen et al. | |
| 10,909,887 | B2 | 2/2021 | Neubauer et al. | |
| 2002/0038685 | A1 * | 4/2002 | Key | G09F 3/0288 428/192 |
| 2005/0278997 | A1 * | 12/2005 | Burtch | G09F 11/00 40/491 |
| 2009/0139126 | A1 * | 6/2009 | Alipour | G09F 3/0289 40/642.02 |
| 2010/0307947 | A1 * | 12/2010 | Marden | G09F 3/04 156/227 |
| 2012/0145579 | A1 * | 6/2012 | Silvano | G09F 3/0288 156/60 |
| 2012/0268837 | A1 * | 10/2012 | Rittenburg | G02B 25/002 359/811 |
| 2014/0068982 | A1 * | 3/2014 | Silvano | G09F 3/10 156/247 |

FOREIGN PATENT DOCUMENTS

| | | | |
|---|---|---|---|
| WO | 2012057843 | A1 | 5/2012 |
| WO | 2012057844 | A1 | 5/2012 |
| WO | 2012057845 | A1 | 5/2012 |
| WO | 2019018448 | A1 | 1/2019 |

* cited by examiner

SPIN REVEAL EXTENDED CONTENT LABEL

CROSS-REFERENCE TO RELATED APPLICATIONS

This application claims priority to, and the benefit of the filing date of, U.S. Provisional Application No. 63/224,441 filed on Jul. 22, 2021, the entire contents of which are hereby incorporated by reference.

TECHNICAL FIELD

This application relates generally to labels and packaging, and particularly to extended content labels.

BACKGROUND

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

The information included on a label may be important information concerning directions for use of a product, or information required by a government agency, for example. The amount of information that can be presented on a label is typically constrained by the size of a surface of the label. In some circumstances, it may be desirable to present more information on a label than can fit on a single surface of the label.

In such a case, a label including an extended text portion may be used. Labels including such extended text portions may be referred to as extended content labels. Extended content labels can be used to increase label space to provide additional information about the article or contents of the article to which the label is affixed, for example.

However, known extended content labels exhibit various drawbacks. For example, the adhesive of a resealable booklet or hinge label may become less effective over time or after several uses, resulting in the label hanging open in an unsightly fashion. As such, it would be desirable for an extended content label to address this and other drawbacks of existing extended content labels.

SUMMARY

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

As described above, there presently are drawbacks or shortcomings of known extended content labels. And so, in one aspect, the present invention avoids, alleviates, or otherwise minimizes these drawbacks or shortcomings. To accomplish this, embodiments of a spin reveal extended content label, in accordance with principles of the invention, are disclosed.

In one aspect of the invention, a label is provided. The label includes a base ply. A tab extends from the base ply in a longitudinal direction. The label also includes a top ply located atop and dimensioned to cover the base ply. The tab of the base ply is not covered by the top ply. The label further includes an outer layer located atop and dimensioned to cover the top ply. The tab of the base ply is secured to the outer layer. Moving the outer layer in a direction pulls a portion of the base ply from beneath the top ply such that the portion of the base ply can be visibly perceived.

In one embodiment, the base ply may further include a spine configured to be separated from the base ply. Further, moving the outer layer in the direction may separate the spine from the base ply. Moreover, the spine may be joined to the top ply by an adhesive applied to a back side of the top ply.

In another embodiment, the top ply may further include a cut-out portion shaped complementary to the tab such that the tab extends into a space created by the cut-out portion. Additionally, a front face of the tab may be secured to an inner side of the outer layer. Further, the tab may be secured to the outer layer by a heat-activated adhesive disposed on the tab.

In yet another embodiment, moving the outer layer in an opposite direction may replace the portion of the base ply beneath the top ply. Furthermore, the outer layer may be a shrink film.

In another aspect of the invention, a method of assembling a label is provided. The method includes providing a base ply including a tab extending from the base ply in a longitudinal direction. The base ply further includes a spine configured to be separated from the base ply. The method also includes applying a top ply atop the base ply. The top ply is dimensioned to cover the base ply. However, the tab of the base ply is not covered by the top ply. The method further includes applying an outer layer atop the top ply. The outer layer is dimensioned to cover the top ply.

In one embodiment, the step of applying a top ply may further include joining the top ply to the spine.

In another embodiment, the method may also include securing the tab to the outer layer. Further, the step of securing the tab may further include disposing a heat-activated adhesive on the tab and heating the heat activated adhesive to fix the tab to the outer layer. Moreover, the outer layer may be a shrink film and the step of heating the heat-activated adhesive may further include shrinking the shrink film.

In yet another embodiment, the method may also include applying the label to an article. Additionally, the article may be a two-piece container.

In a further aspect of the invention, a method for using a label is provided. The method includes providing an article including the label. The label includes a base ply including a tab extending from the base ply in a longitudinal direction. The base ply further includes a spine configured to be separated from the base ply. The label also includes a top ply located atop and dimensioned to cover the base ply. The tab of the base ply is not covered by the top ply. The label further includes an outer layer located atop and dimensioned to cover the top ply. The tab is secured to the outer layer. The method also includes rotating the outer layer in a direction thereby pulling a portion of the base ply from beneath the top ply.

In one embodiment, the step of rotating the outer layer in the direction may further include separating the spine from the base ply. Additionally, the step of rotating the outer layer in the direction may also include overlapping the top ply with the base ply. Further, the method may also include rotating the outer layer in an opposite direction thereby replacing the portion of the base ply beneath the top ply.

Advantageously, the embodiments of the present invention provide a spin reveal extended content label that avoids, alleviates, or otherwise minimizes the drawbacks or shortcomings of existing extended content labels. Other aspects, features, benefits, and advantages of embodiments of the present invention will become apparent to a person of skill in the art from the detailed description of various embodiments with reference to the accompanying drawing figures, all of which comprise part of the disclosure. The steps and elements described herein as part of various embodiments and aspects can be reconfigured and combined in different combinations to achieve the desired technical effects as may be desired. To this end, the embodiments and aspects can be combined in any combination or sub-combination.

BRIEF DESCRIPTION OF THE DRAWINGS

The accompanying drawings, which are incorporated in and constitute a part of this specification, illustrate embodiments of the invention and, together with the detailed description given below, serve to explain the invention.

DETAILED DESCRIPTION OF THE INVENTION

The exemplary embodiments described herein are provided for illustrative purposes and are not limiting. Other exemplary embodiments are possible, and modifications may be made to the exemplary embodiments within the scope of the present disclosure. Therefore, this Detailed Description is not meant to limit the scope of the present disclosure.

With reference to FIGS. 1 through 6B, an embodiment of a spin reveal extended content label 10 or portions thereof is shown in detail. Advantageously, the spin reveal extended content label 10 offers increased label space that can be used to provide additional information about the article 12 or contents of the article 12 to which the label is affixed, for example. In addition to the increased label space offered, the spin reveal extended content label 10 also remedies or minimizes at least some of the issues experienced with other known extended content labels. For example, the extended text of the spin reveal extended content label 10 on a base ply 14 can be extended from and retracted under a top ply 16 in such a way as to conceal and store the extended text when the extended text is not actively being read. Other advantages and technical effects of the embodiments of this invention will become evident to one skilled in the art from the following description.

Figure 1:
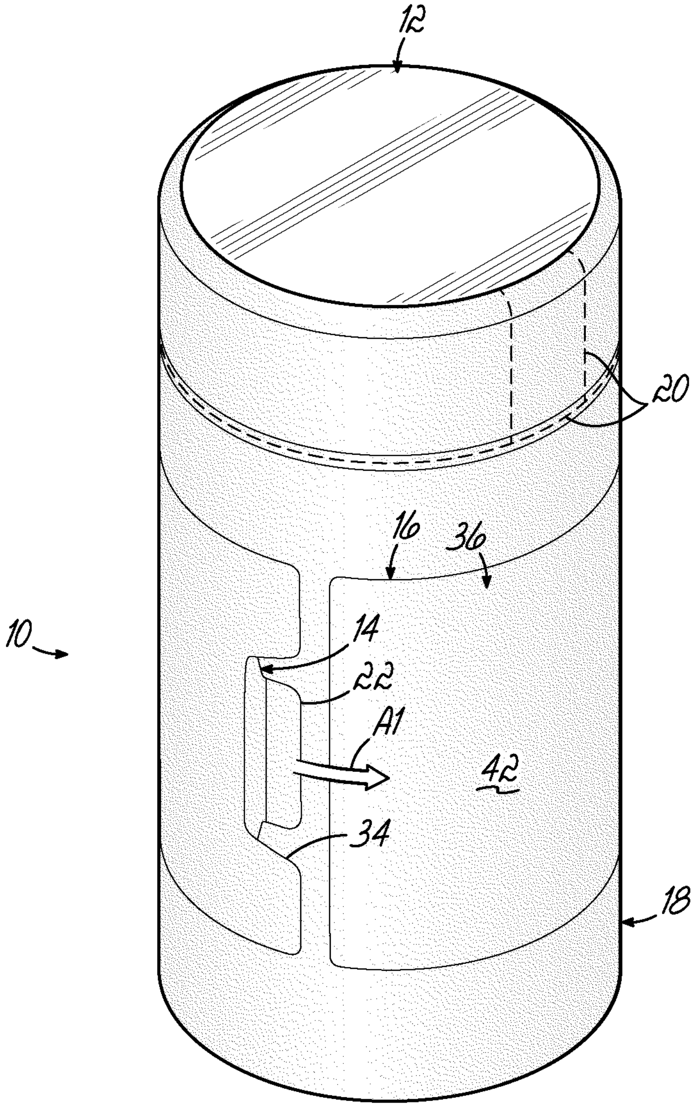
FIG. 1 is a perspective view of an embodiment of a spin reveal extended content label affixed to an article.

Beginning with reference to FIG. 1, an embodiment of the spin reveal extended content label 10 is shown as applied to an article 12. In the illustrated embodiment, the article 12 is a two-piece container. However, it is to be understood that the article 12 could take on other forms other than a two-piece container. In an alternative embodiment, the article 12 could be of unitary construction, for example. In an embodiment, the spin reveal extended content label 10 includes at least three parts—a base ply 14, a top ply 16, and an outer layer, which may be an outer shrink film 18. The base ply 14, top ply 16, and outer shrink film 18 are described in greater detail below.

At a high level, the parts of the spin reveal extended content label 10 work together as follows. The base ply 14 is dimensioned to fit under the top ply 16. The top ply 16 conceals a large portion the base ply 14. The exposed tab 22 of the base ply 14 is secured to the outer shrink film 18. The outer shrink film 18 is applied to the article 12 in such a way as to be rotatable about the article 12. Rotating the outer shrink film 18 in a direction, as shown by arrow A1, results in base ply 14 being pulled out from under the top ply 16 such that the base ply 14 (and the extended text thereon, for example) can be visibly perceived. To replace the base ply 14 back under the top ply 16, a user need only to rotate the outer shrink film 18 in an opposing direction, e.g., opposite the direction indicated by arrow A1.

In the illustrated embodiment, the outer shrink film 18 is a raw clear film with no adhesive. Further, in this embodiment the outer shrink film 18 includes perforations 20. The perforations 20 help a user to remove a portion of the outer shrink film 18 so as to access the contents within the article 12. The perforations 20 also serve as a security feature—evidencing attempts at tampering with the article 12 or the contents of the article 12. However, it is to be understood that the outer shrink film 18 does not necessarily include perforations 20. In an alternative embodiment, the outer shrink film 18 may not include perforations 20.

Still referring to FIG. 1, the outer shrink film 18 is applied to the article 12 after the base ply 14 and top ply 16 have been applied. The outer shrink film 18 is trimmed, glued or seamed, and cut into a loose tubular shape. The outer shrink film 18 is then positioned over the article 12 and the article 12 is heated or steamed. The heat or steam shrinks the outer shrink film 18 to the proper size, e.g., the size to properly cover and seal the article 12 (or shrinking of the film may occur during cooling of a heated or steamed film). In this embodiment, the outer shrink film 18 is sized so as to be positioned close to the bottom of the body of the article 12, but not extending under or into the radius of the article 12 bottom edge. Further, if the outer shrink film 18 does not include perforations 20, then the outer shrink film 18 may be held short of the top edge of the body of the article 12.

Figure 2A:
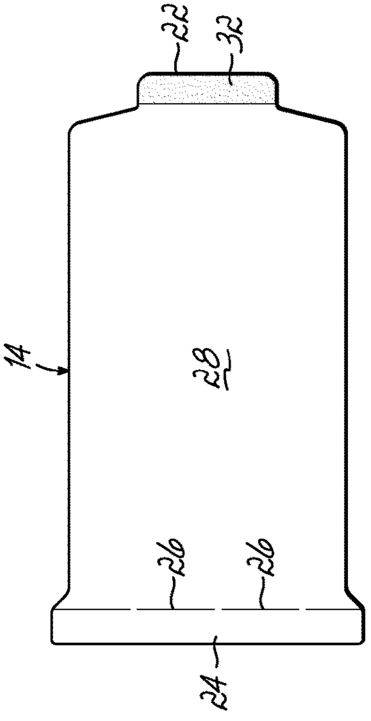
FIG. 2A is a front view of a base ply of a pressure sensitive label portion of the spin reveal extended content label of FIG. 1.
Figure 2B:
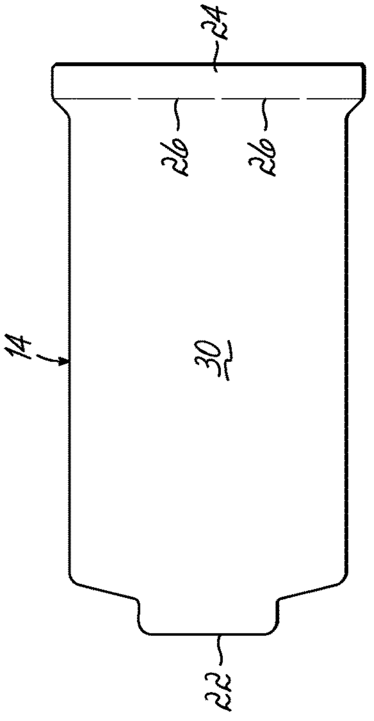
FIG. 2B is a rear view of the base ply of the pressure sensitive label portion of the spin reveal extended content label of FIG. 1.

Referring now to FIGS. 2A and 2B, an embodiment of a base ply 14 is shown. The base ply 14 may be raw paper or film and generally features no adhesive, except for a portion of the base ply 14. The base ply 14 of the illustrated embodiment is generally rectangular in shape. The base ply 14 is shaped and sized as to comfortably fit under the top ply 16. At an end, the base ply 14 features a spine 24. The spine 24 is divided from the rest of the base ply 14 by a series of cuts 26. The cuts 26 extend through the width of the base ply 14—from the front face 28 of the base ply 14 (facing away from the article 12) to the back face 30 of the base ply 14 (facing towards the article 12). The cuts 26 are intended to weaken the connection between the spine 24 and the rest of the base ply 14 such that the base ply 14 will detach from the spine 24 with minimal pull or rotated stress.

At an opposing end, the base ply 14 features a tab 22. The tab 22 extends in a longitudinal direction relative to the base ply 14. As can be seen in FIG. 2A, the front face 28 of the tab 22 includes heat-activated adhesive 32. The heat-activated adhesive 32 is configured to adhere to the inner side of the outer shrink film 18 when the outer shrink film 18 is heated or steamed. In other words, the heating or steaming of the outer shrink film 18 serves to shrink the outer shrink film 18 to its proper size, but also further serves to activate the heat-activated adhesive 32 of the tab 22 thereby securing, e.g., permanently, the tab 22 (and thus the base ply 14) to the outer shrink film 18. As noted above, shrinking could alternatively occur upon cooling of a heated or steamed film, for example. As can be seen in FIG. 2B, in this embodiment, no heat-activated adhesive 32 is featured on the back face 30 of the tab 22.

Figure 3A:
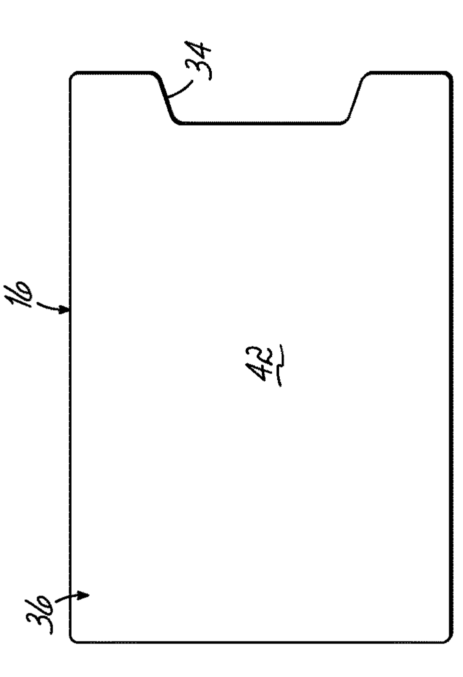
FIG. 3A is a front view of a top ply of the pressure sensitive label portion of the spin reveal extended content label of FIG. 1.
Figure 3B:
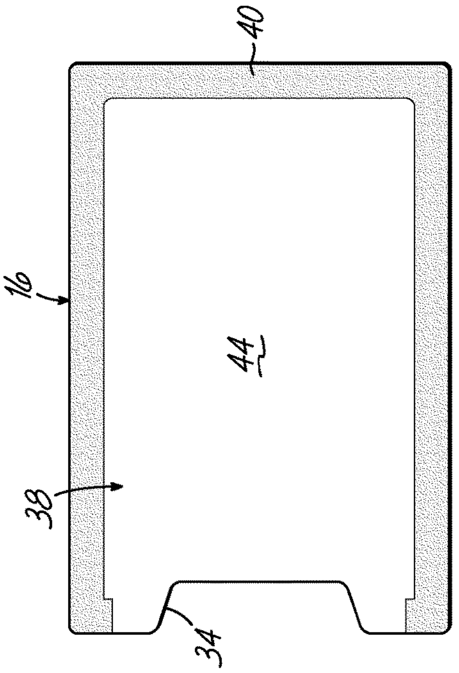
FIG. 3B is a rear view of the top ply of the pressure sensitive label portion of the spin reveal extended content label of FIG. 1.

Turning to FIGS. 3A and 3B, an embodiment of the top ply 16 is shown. The top ply 16 is generally rectangular in shape, but greater in dimension than the base ply 14. The top ply 16 is dimensioned to mostly conceal the base ply 14 beneath itself when applied to the article 12. At an end, the top ply 16 features a cut-out portion 34. The cut-out portion 34 is shaped complementary to the tab 22 of the base ply 14 such that when the top ply 16 is laid overtop the base ply 14, the tab 22 will extend into a space created by the cut-out 34. Thus, the tab 22 is exposed and not covered by the top ply 16 (and thus capable of being secured to the outer shrink film 18) when the top ply 16 is on top of the base ply 14.

As can be seen in FIG. 3A, in this embodiment, the front side 36 (facing away from the article 12) of the top ply 16 features no adhesive. However, as can be seen in FIG. 3B, the back side 38 (facing towards the article 12) of the top ply 16 features peripheral adhesive 40. The peripheral adhesive 40 extends around three of the four sides of the back side 38 of the top ply 16—that is, every side except for the side featuring the cut-out 34.

To arrive at the peripheral adhesive 40, the construction of the top ply 16 includes a pressure sensitive paper or film face or cover sheet 42 and a paper or film liner 44. The rear (facing towards the article 12) of the face or cover sheet 42 includes an adhesive. The liner 44 is adhered to the rear of the face or cover sheet 42 and overlays a significant, central portion of the rear of the face or cover sheet 42—except for the areas where the peripheral adhesive 40 is exposed. In an embodiment, the liner 44 covers a central portion of the rear of the face or cover sheet 42 to form a barrier between the adhesive of the face or cover sheet 42 and the base ply 14 beneath the top ply 16. To expose the peripheral adhesive 40 around the edges of the face or cover sheet 42, part of the liner 44 is removed via pattern cut. The result of the combination of the face or cover sheet 42 and patterned cut liner 44 is the top ply 16 as shown in FIGS. 3A and 3B. In an alternative embodiment, the adhesive in the central portion of the rear of the face or cover sheet 42 may be deadened without use of a liner 44 and instead by spot print plate applying a varnish, primer, release, or silicone to the area. Such application may be of a water-base, solvent-base, or UV coating, for example. In a further alternative embodiment, the peripheral adhesive 40 may be applied (e.g., pattern printed) to the periphery (e.g., border areas) of the rear of the face or cover sheet 42 and not to the central portion of the rear of the face or cover sheet 42. In such an embodiment, it would be unnecessary to deaden (e.g., with a liner 44 or by other means as described above) a portion of the applied adhesive.

Figure 4A:
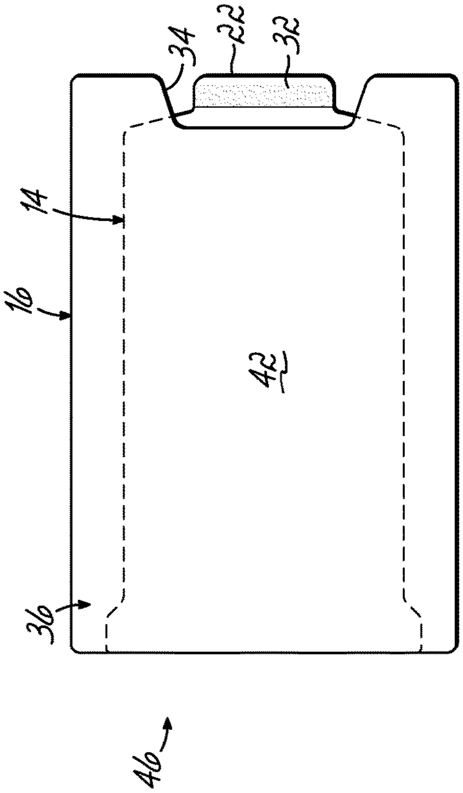
FIG. 4A is a front view of the pressure sensitive label portion of FIG. 1.
Figure 4B:
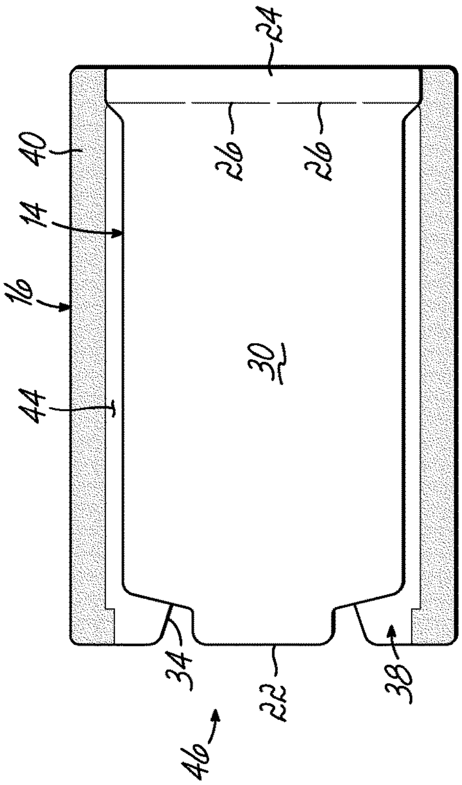
FIG. 4B is a rear view of the pressure sensitive label portion of FIG. 1.

Referring now to FIGS. 4A and 4B, the combination of the base ply 14 and the top ply 16 is shown. Such a combination of the base ply 14 and top ply 16 may be referred to as the pressure sensitive label portion 46 of the spin reveal extended content label 10. To form the pressure sensitive label portion 46, the front face 28 of the spine 24 on of the base ply 14 is attached to the peripheral adhesive 40 located opposite of the cut-out 34 on the back side 38 of the top ply 16 (best shown in FIG. 4B). Joining the spine 24 to the peripheral adhesive 40 secures the base ply 14 and the top ply 16 together. The remaining peripheral adhesive 40 (e.g., the portions of the peripheral adhesive 40 not joined to the base ply 14) are then utilized to apply the pressure sensitive label portion 46 to the article 12. Prior to application, the base ply 14 and the top ply 16 are laminated to each other and passed through to external shape die cutting to complete the construction of the pressure sensitive label portion 46.

In an embodiment, the pressure sensitive label portion 46 can be applied directly to the outer surface of the article 12. In such an embodiment, the peripheral adhesive 40 would adhere directly to the article 12. Alternatively, an intermediary carrier ply (not shown) may be used. The carrier ply may be paper or film. In such an embodiment, the pressure sensitive label portion 46 is applied to the carrier web, laminated together, passed through to external shape die cutting, and then the carrier web is applied directly to the article 12.

Figure 5A:
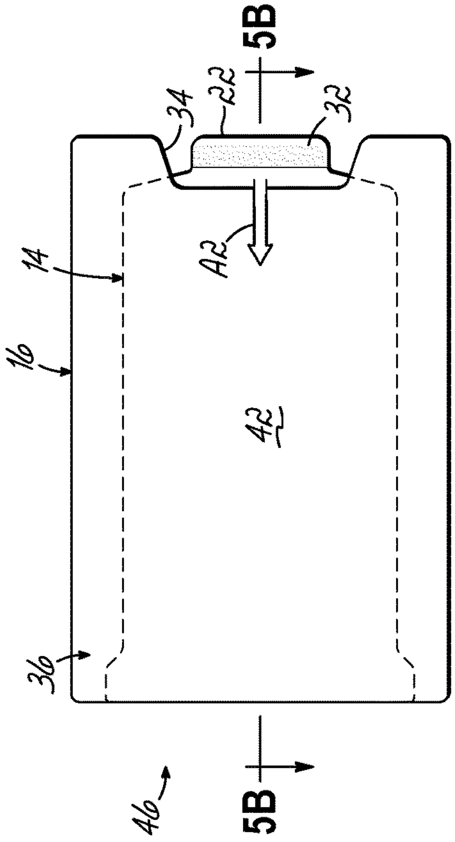
FIG. 5A is a front view of the pressure sensitive label portion of FIG. 1 in a retracted position.
Figure 5B:
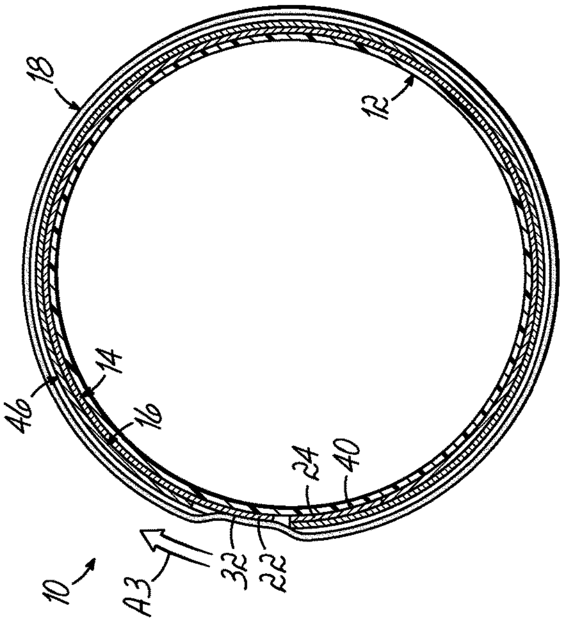
FIG. 5B is a cross-sectional view of the pressure sensitive label portion of FIG. 1 in the retracted position taken along line 5B-5B in FIG. 5A.

Turning to FIGS. 5A and 5B, the figures show the spin reveal extended content label 10 in a retracted position. As can be seen in FIG. 5A, in the retracted position, the base ply 14 is concealed beneath the top ply 16, as indicated by arrow A2. In the case that additional, e.g., extended, text was included on the front face 28 of the base ply 14, a user would be unable to read the text while the spin reveal extended content label 10 is in a retracted position. Similarly, FIG. 5B shows a cross-section of the spin reveal extended content label 10 in a retracted position, as indicated by arrow A3.

Figure 6A:
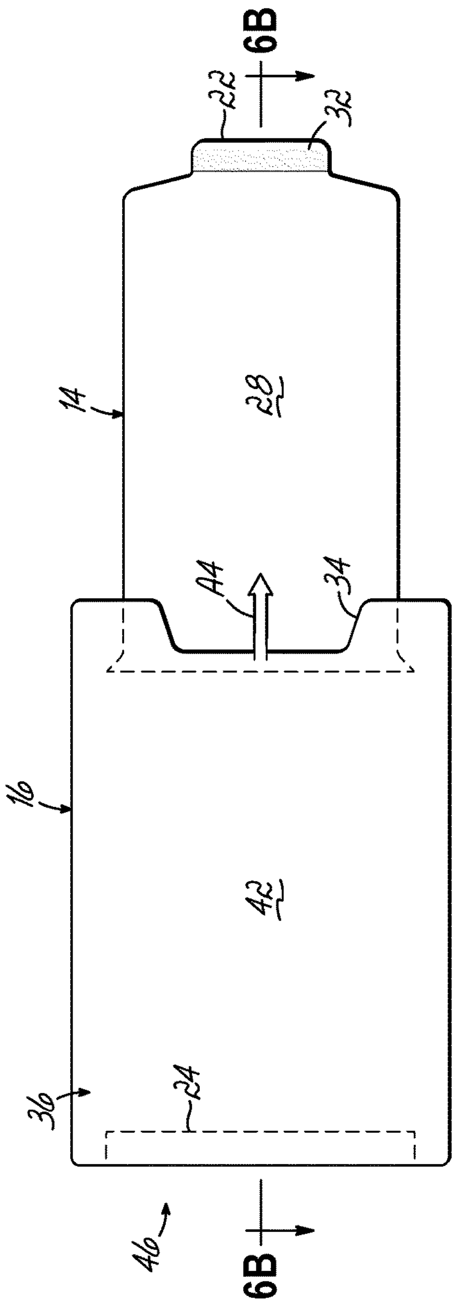
FIG. 6A is a front view of the pressure sensitive label portion of FIG. 1 in an extended position.
Figure 6B:
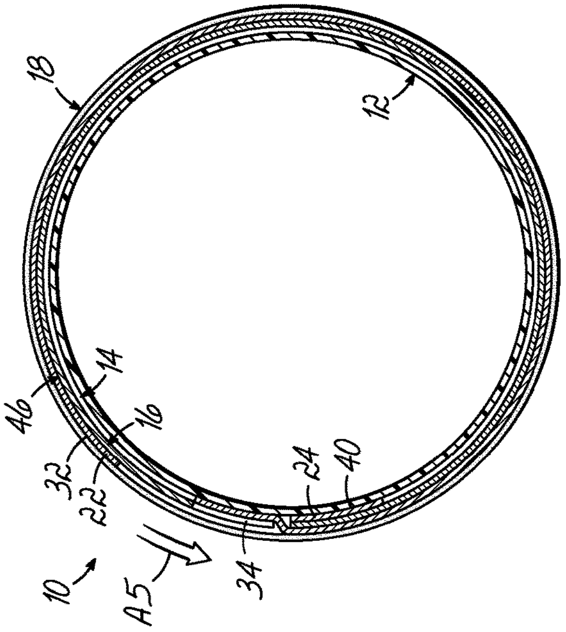
FIG. 6B is a cross-sectional view of the pressure sensitive label portion of FIG. 1 in the extended position taken along line 6B-6B in FIG. 6A.

Referring now to FIGS. 6A and 6B, the figures show the spin reveal extended content label 10 in an extended position. To change the spin reveal extended content label 10 from the retracted position to the extended position, a user need only to rotate or spin the outer shrink film 18 (e.g., counterclockwise), as shown by arrow A4 in FIG. 6A and arrow A5 in FIG. 6B. Because the base ply 14 is secured to the outer shrink film 18 by heat-activated adhesive 32 on the tab 22, rotating or spinning the outer shrink film 18 has the effect of applying a force to the base ply 14. The force applied by rotation or spinning will cause the spine 24 of the base ply 14 to separate from the remainder of the base ply 14. The spine 24 will remain in place (attached to the top ply 16 via peripheral adhesive 40) while the rest of the base ply 14 is free to rotate or spin with the outer shrink film 18.

As the base ply 14 transitions to the extended position from the retracted position, the base ply 14 begins to overlap top ply 16 (as shown best in FIG. 6B) such that portions of the top ply 16 will no longer be observable by a user. As can be seen in FIGS. 6A and 6B, after rotation or spinning into the extended position, the base ply 14 is (mostly) no longer concealed beneath the top ply 16. In the extended position, extended text included on the front face 28 of the base ply 14 is now accessible to a user to read. If a user wishes to return the spin reveal extended content label 10 to the retracted position from the extended position, the user need only to rotate or spin the outer shrink film 18 in the opposite direction (e.g., clockwise). Such will return the base ply 14 to its original position beneath the top ply 16.

While the present invention has been illustrated by the description of various embodiments and while these embodiments have been described in some detail, it is not the intention of the Applicant to restrict or in any way limit the scope of the invention to such detail. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A label comprising:

a base ply, a tab extending from the base ply in a longitudinal direction;

a top ply located atop and dimensioned to cover the base ply, the tab of the base ply not covered by the top ply; and an outer layer located atop and dimensioned to cover the top ply, the tab of the base ply secured to the outer layer, wherein moving the outer layer in a direction pulls a portion of the base ply from beneath the top ply such that the portion of the base ply can be visibly perceived.

2. The label of claim 1, wherein the base ply further includes a spine configured to be separated from the base ply.

3. The label of claim 2, wherein moving the outer layer in the direction separates the spine from the base ply.

4. The label of claim 2, wherein the spine is joined to the top ply by an adhesive applied to a back side of the top ply.

5. The label of claim 1, wherein the top ply further includes a cut-out portion shaped complementary to the tab such that the tab extends into a space created by the cut-out portion.

6. The label of claim 1, wherein a front face of the tab is secured to an inner side of the outer layer.

7. The label of claim 1, wherein the tab is secured to the outer layer by a heat-activated adhesive disposed on the tab.

8. The label of claim 1, wherein moving the outer layer in an opposite direction replaces the portion of the base ply beneath the top ply.

9. The label of claim 1, wherein the outer layer is a shrink film.

10. A method of assembling a label, the method comprising:

providing a base ply including a tab extending from the base ply in a longitudinal direction and further including a spine configured to be separated from the base ply;

applying a top ply atop the base ply, the top ply dimensioned to cover the base ply, the tab of the base ply not covered by the top ply;

applying an outer layer atop the top ply, the outer layer dimensioned to cover the top ply; and securing the tab to the outer layer.

11. The method of claim 10, wherein the step of applying the top ply further comprises joining the top ply to the spine.

12. The method of claim 10, wherein the step of securing the tab further comprises:

disposing a heat-activated adhesive on the tab; and heating the heat-activated adhesive to fix the tab to the outer layer.

13. The method of claim 12, wherein the outer layer is a shrink film, and the step of heating the heat-activated adhesive further comprises shrinking the shrink film.

14. The method of claim 10, further comprising applying the label to an article.

15. The method of claim 14, wherein the article is a two-piece container.

16. A method for using a label, the method comprising:

providing an article including the label, the label comprising:

a base ply including a tab extending from the base ply in a longitudinal direction and further including a spine configured to be separated from the base ply;

a top ply located atop and dimensioned to cover the base ply, the tab of the base ply not covered by the top ply; and an outer layer located atop and dimensioned to cover the top ply, the tab secured to the outer layer; and rotating the outer layer in a direction thereby pulling a portion of the base ply from beneath the top ply.

17. The method of claim 16, wherein the step of rotating the outer layer in the direction further comprises separating the spine from the base ply.

18. The method of claim 16, wherein the step of rotating the outer layer in the direction further comprises overlapping the top ply with the base ply.

19. The method of claim 16, further comprising rotating the outer layer in an opposite direction thereby replacing the portion of the base ply beneath the top ply.

* * * * *